Figure 1:
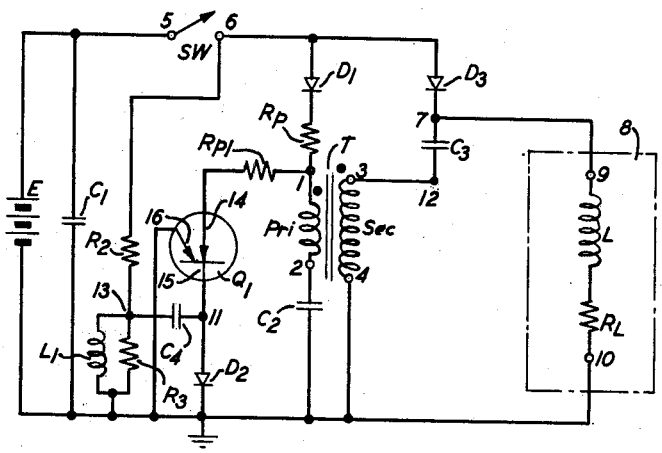

Sept. 15, 1964

C. E. BARNES ETAL
CIRCUIT FOR PRODUCING CURRENT PULSES
HAVING OVERSHOOT AND UNDERSHOOT
Filed Nov. 7, 1960

3,149,245

INVENTORS: C. E. BARNES
R. V. GOORDMAN
BY Donald M Duft
ATTORNEY

United States Patent Office 3,149,245
Patented Sept. 15, 1964

3,149,245
CIRCUIT FOR PRODUCING CURRENT PULSES HAVING OVERSHOOT AND UNDERSHOOT
Clare E. Barnes, Passaic Township, Morris County, and Robert V. Goordman, Summit, N.J., assignors to Bell Telephone Laboratories, Incorporated, New York, N.Y., a corporation of New York
Filed Nov. 7, 1960, Ser. No. 67,635
18 Claims. (Cl. 307—106)

This invention relates to a pulse generator and, more particularly, to a pulse generator capable of producing current pulses in inductive loads having overshoot and undershoot on the leading and trailing pulse edges, respectively.

As used in this specification, the term "pulses" includes both pulses of a high repetition rate, such as the output of a high frequency multivibrator, as well as those of a low repetition rate, such as the current wave form resulting from the periodic closure of a circuit for an extended duration followed by an opening of the same circuit.

Current pulses of the type generated by the present invention are useful in a number of applications, including the generation of extremely rapid changes in magnetic fields with electromagnetic devices such as, for example, relays and magnetic cores. Magnetic field changes often tend to lag the current changes in the windings of such devices by an appreciable amount. This lag is not constant and varies in accordance with a number of factors including the nature of the material used in each device, the geometry of the magnetic path, and the eddy current losses within the material. Circuit designers attempt to overcome such lags and thereby effect the faster switching of the magnetic fields (and hence, the faster change of state of the devices with which the fields are associated) by applying to the energizing windings current pulses having overshoot on the leading edge each time the field is to be increased and having undershoots on the trailing edge each time the field is to be decreased or restored to its normal condition. The overshoot and undershoot of the current pulses tend to cancel the normal lag in magnetic field changes and thereby produce fields having steeper leading and trailing edges.

If the aforementioned expedient is to be successful in producing the desired rapid magnetic field changes, it is necessary that the rise and fall times of the applied current pulses be as short as possible. However, this is often difficult to accomplish due to the fact that the winding inductance of these devices causes the current changes to lag the applied voltage changes by an appreciable amount. Therefore, it may be seen that rapid field changes in magnetic devices are dependent upon the rapidity with which the winding currents rise to the desired magnitude in these devices once their energizing circuits are closed.

As long as the inductance and resistance of a load remain constant, the time required for a given current to be generated therein is determined largely by the applied voltage. It is well known that the current produced in a series inductive circuit in response to the application of a voltage step function is $$I(t) = E/R\left(1 - e^{\frac{-tR}{L}}\right) \quad \text{(Equation 1)}$$

where E is the applied voltage and where R and L are the resistance and inductance, respectively, of the load. From this, one may obtain the familiar relationship $$\tau = 2.2 \frac{L}{R} \quad \text{(Equation 2)}$$

for the time required for the current to rise from 10 to 90 percent of its final value $E/R$.

Equation 1 expresses the magnitude of the current for all possible combinations of values for the variables $t$, $V$, $R$ and $L$. Equation 2 is not concerned with any particular current magnitude but instead, merely expresses the time required for the current to rise from 10 to 90 percent of its steady state value after its energizing circuit is closed. The value of $\tau$ in Equation 2 is thus a constant for a given load, is independent of $V$, and is commonly termed the rise time of the load.

It is obvious from an inspection of Equation 2 that the rise time for a given inductive load can be decreased by increasing its resistance. However, an increase in load resistance would require a comparable increase in applied voltage if the peak and steady state load current is to be held constant. Also, an increase in the resistance of a circuit through which a constant current is maintained increases the power dissipated in the circuit ($P = I^2R$) proportionately with the increase in resistance. This tends to limit the number of instances in which the rise time can be improved by an increase in the load resistance and applied voltage since, in most cases, the resulting increase in power cannot be furnished by the power supply and/or dissipated by the load.

It may be seen from Equation 1 that the magnitude of the load current at any particular time is directly proportional to the applied voltage and, therefore, a quicker current rise could be obtained by increasing the voltage to effect either a larger current in the same time or the same current in a shorter time. For example, if the application of 10 volts to an inductive circuit produces a current of .2 ampere in 100 milliseconds, the voltage can be raised to 20 in order to develop a current of .4 ampere in the same time or to develop the same current of .2 ampere in a shorter time. It should be observed that increasing the voltage does not effect the rise time of the load as expressed in Equation 2 since the load current will still require the same time to rise from 10 to 90 percent of its new final value.

It is apparent from the foregoing that if no other circuit limitations were present, circuit designers could obtain more rapid magnetic field changes by merely raising the applied voltage in order to reduce the time required to achieve a predetermined current in an inductive load. However, increasing the voltage also causes a proportionate increase in steady state current and, therefore, shorter rise times cannot usually be obtained by this expedient since the resulting steady state current and power dissipation in the load become objectionable.

It is therefore an object of the invention to provide short rise time current pulses having overshoot and undershoot on the leading and trailing pulse edges, respectively.

It is a further object of the invention to achieve the aforementioned object without an appreciable concomitant rise in steady state load current or power.

The present invention reduces the time required for a desired magnetic field change to be developed within an electromagnetic device by temporarily reducing the rise time of its energizing circuit and, at the same time, generating a current whose leading edge has a short rise time and an amplitude that is far greater than the steady state current required to maintain the desired field. This large initial current is produced by the temporary insertion of a resistance in series with the winding and by the simultaneous application of a high voltage to the resulting series circuit. The large amplitude of the leading edge of the developed current effectively overcomes the eddy current losses and produces a resultant magnetic field whose rise is far more rapid than would be the case if the amplitude of the leading edge of the current in the winding did not exceed the amplitude of the steady state current. Once the magnetic field has attained the desired strength, the rise time of the circuit is restored to its original value and the applied voltage is reduced to permit the current to decline to the value necessary to maintain the field at the desired steady state strength.

The present invention also minimizes the decay time of a magnetic field by applying a controlled amount of undershoot to the trailing edge of the energizing current pulse. This undershoot produces a reverse current in the winding which persists only for a time sufficient to enable it to effectively cancel the eddy current losses within the material and thereby permit the magnetic field to restore to its normal condition in a shorter time. The current undershoot is effected by the simultaneous insertion of a high series resistance in series with the winding and the application of a high voltage to the series circuit with a polarity opposite to that used to effect the overshoot on the leading pulse edge.

The sequential application of the two different potentials, as described, results in a significant improvement in the time required to achieve a given current and magnetic field change. This improvement is achieved with no appreciable increase in the average power from the power supply and with no appreciable increase in the average power dissipated in the load providing the switching transient is applied over a period short compared to the length of the pulse. This is so because the steady state current and hence the steady state power is unchanged from that required by the load in the absence of any overshoot or undershoot and, if the pulse is long compared to the switching transient, the average power approaches the steady state power.

A feature of the invention is the provision of a circuit which produces short rise time current pulses in inductive loads having overshoot on their leading edges by momentarily reducing the rise time of the load for a time sufficient to enable the desired current overshoot to be obtained and by then restoring the rise time to its normal value while maintaining the steady state current at the desired value.

A further feature of the invention is the provision of a circuit for effecting the production of a short rise time current pulses in inductive loads having overshoot on their leading edges by first applying a relatively high potential and by then removing the high potential and applying a lower potential to the load upon the generation of each pulse.

A further feature of the invention is the provision of a circuit for producing short rise time current pulses in inductive loads having overshoot on their leading edges by applying a relatively high potential to the load until the current reaches the desired amount of overshoot and by then removing the high potential and applying a relatively low potential to the load to maintain the current at the desired steady state value for the duration of each pulse.

A further feature of the invention is the provision of a circuit for producing short rise time current pulses having overshoot on their leading edges in inductive loads comprising a step-up transformer whose secondary momentarily applies a high potential to the load to effect the desired current overshoot at the beginning of each pulse together with means for removing this high potential and for connecting a lower potential to the load to maintain the steady state current at the desired value for the duration of each pulse.

A further feature of the invention is the provision of a circuit which produces current pulses in inductive loads having overshoot and undershoot on their leading and trailing edges, respectively, by momentarily reducing the rise time of the load and applying a high potential thereto for a time sufficient to enable the desired overshoot to be obtained, by then restoring the rise time to its normal value while removing the high potential and applying a lower potential to the load to maintain the steady state current at the desired level for the duration of a pulse, and by then momentarily reducing the rise time of the load and applying a high potential of opposite polarity thereto for a time sufficient to enable the desired current undershoot to be obtained.

A further feature of the invention is the provision of a circuit for generating current pulses in inductive loads having overshoot and undershoot on their leading and trailing edges, respectively, by sequentially applying a relatively high potential to the load upon the generation of each pulse, by applying a lower potential to the load upon the generation of each pulse, by applying a lower potential to the load for the duration of each pulse, and by applying a high potential of reverse polarity to the load upon the termination of each pulse.

A further feature of the invention is the provision of a circuit which produces short rise time current pulses in inductive loads having overshoot and undershoot on their leading and their trailing edges, respectively, by first applying a relatively high potential to the load until the current reaches the desired amount of overshoot, by then removing the high potential and applying a relatively low potential to the load to maintain the current at the desired steady state value for the duration of each pulse, and by then applying a relatively high potential of reverse polarity to effect a momentary reverse current having the desired amount of undershoot in the load.

A further feature of the invention is the provision of a circuit for producing short rise time current pulses in inductive loads having overshoot and undershoot on their leading and trailing edges, respectively, comprising a step-up transformer whose secondary momentarily applies a high potential to the load to effect the desired current overshoot at the beginning of each pulse, means for removing this high potential and for connecting a lower potential to the load to maintain the steady state current at the desired value for the duration of each pulse, together with means for causing the transformer to apply a high potential of reverse polarity to the load at the end of each pulse to effect a reverse current therein.

These and other objects and features will become apparent upon a reading of the following description of the invention taken in conjunction with the drawings, in which:

FIG. 1 discloses the circuit details of the invention; and

Figure 2:
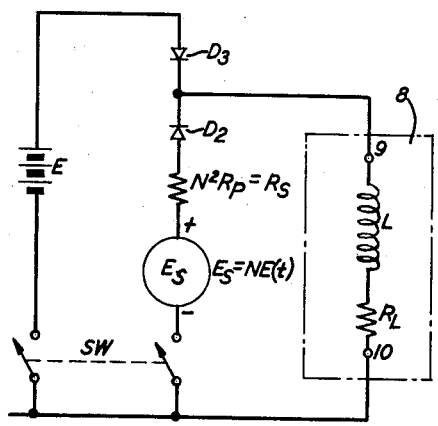

FIG. 2 discloses a portion of the circuit of FIG. 1 in equivalent form.

Referring to FIG. 1, the load is shown within the rectangle 8 and comprises inductance L and resistance $R_L$ which are connected in series between terminals 9 and 10. This load may comprise the winding of an electromagnetic device in which it is desired to effect rapid field changes. Resistance $R_L$ may comprise the internal resistance of the inductance or it may comprise the resistance of the inductance together with any resistance inserted in series therewith. The lower portion of the load is connected via terminal 10 to a common ground. The upper portion of the load is connected in series with diode D3 to the terminal 6 side of switch SW. Terminal 9 of the load is also connected in series with condenser C3 and the secondary of transformer T to ground. The transformer is of the step-up variety and has a turns ratio N. The primary of the transformer is connected in a series circuit which extends from the terminal 6 side of the switch to ground and which comprises diode D1, resistor $R_P$, the primary winding and condenser C2. Terminal 1 of the transformer is also connected to ground by a series circuit comprising resistance $R_{P1}$, the solid state thyratron Q1 and diode D2.

Terminal 6 of the switch is also connected to ground by a circuit comprising resistance R2 in series with the parallel combination of inductance $L_1$ and resistance R3. Condenser C4 interconnects terminals 11 and 13. Resistances R2 and R3 together with inductance $L_1$ and condenser C4 comprise a portion of the reset or undershoot circuit as hereinafter explained.

The power source for this circuit is represented by the battery E which may comprise any type of power supply capable of furnishing the required voltage and current. Condenser C1 shunts battery E in order to minimize voltage fluctuations during periods of momentarily heavy load currents. The switch SW is closed to initiate a current in the load and is opened to terminate the load current. The switch, which is shown to be of the mechanical type, may comprise any type of switch known in the art such as a vacuum tube, a thyratron, a transistor, and so forth.

The closure of switch SW applies the positive potential of battery E to terminal 6. Condenser C2, which is discharged at this time, presents a momentary low impedance path to ground for the series circuit comprising diode D1, resistor $R_P$, and the primary of the transformer. The initial current in this circuit is limited only by the resistance of resistor $R_P$ and the reflected resistance of the secondary and thus, when the switch is closed, the current rapidly reaches the value $$\frac{E}{R_P+\frac{R_L}{N^2}}=\frac{N^2 E}{N^2 R_P+R_L}$$

The drop across the resistance in this circuit causes less than all of the entire battery potential E to appear across the primary of the transformer which, in turn, induces a voltage of approximately KNE in the secondary where K is a function of $R_P$ and $R_L/N^2$. However, the factor K may be ignored for all practical purposes and it may be assumed that the initial potential of the secondary circuit is NE by the following reasoning. It has been shown that the initial primary current is equal to $$I_P=\frac{N^2 E}{N^2 R_P+R_L}$$

Since the transformer is of the step-up variety, the secondary current is reduced by a factor of N and is thus equal to $$I_S=\frac{I_P}{N}=\frac{NE}{N^2 R_P+R_L}$$

From this, the secondary current can be thought of as being caused by a voltage of NE impressed on a resistance $N^2 R_P + R_L$.

From the foregoing it may be observed that the reflected resistance from the primary is effectively in series with the load resistance so that the rise time of the load offered to the secondary becomes $$2.2 \frac{L}{R_S + R_L}$$

where $R_S = N^2 R_P$. The potential NE impressed upon this load causes the load current to increase toward the desired overshoot value at a rate governed by the rise time of the effective load now seen by the secondary.

Diode D3 is back-biased at this time and prevents the battery E from shunting the secondary. The current through the primary decays exponentially as condenser C2 becomes charged and, in turn, causes the voltage induced in the secondary to decay. Once the load current attains the desired overshoot it also decays exponentially along with the secondary potential NE. Finally, the current decays to its steady state value $(E/R_L)$ at the time the potential applied to the load by the secondary equals and then finally becomes less than the voltage from source E. At this time, the diode D3 is no longer back-biased and source E is then effectively applied to the load to maintain the steady state current for the duration of the pulse.

When switch SW is opened to terminate the pulse, the cessation of current in inductance L causes a negative pulse to be induced on terminal 13 by the back EMF of the inductance $L_1$. This pulse is applied through condenser C4 to terminal 11 which is the junction of diode D2 and solid state thyratron Q1. This negative pulse momentarily forward biases thyratron Q1 and causes it to fire through diode D2 to ground. The thyratron has an extremely low forward impedance in this condition and thereby discharges condenser C2 to ground through resistance $R_{P1}$ and the primary of the transformer. The discharge current of the condenser induces a voltage in the secondary which, in turn, induces a current in the load which is opposite to that induced on the initiation of the pulse. This reverse current in the load generates a magnetic force which cancels the eddy current losses in the material and thereby permits the total resultant magnetic field in the load to decay rapidly.

The value of resistances $R_P$ and $R_{P1}$ are somewhat critical since the value of resistance $R_P$ determines the amount of current overshoot while the value of resistance $R_{P1}$ determines the amount of undershoot that will be developed. In order to determine the value of resistor $R_P$, let it be assumed that the transformer comprises a voltage step function generator which supplies a voltage $E_S = NEf(t)$ where E is the battery voltage, where $E_S$ is the secondary voltage, and where N is the transformer turns ratio. Let the impedance of the generator be the transformed primary impedance $R_S = N^2 R_P$. This is shown in FIG. 2 which discloses a portion of the circuit of FIG. 1 in equivalent form. The peak current induced in the load by the secondary is $$I_{Peak} = \frac{NE}{R_S + R_L}$$

Let it also be assumed that the peak current during overshoot is to be twice the steady state current $E/R_L$.

Equating:

$$I_{Peak} = \frac{NE}{R_S + R_L} = 2 \frac{E}{R_L}$$

and solving for the total series resistances $R_S + R_L$ gives $$R_S + R_L = \frac{NR_L}{2} \text{ or } R_S = \left(\frac{N}{2} - 1\right) R_L \text{ or } R_P = \frac{(N-2)R_L}{2N^2}$$

Inspection of this circuit in light of the expression for the rise time in Equation 2 shows that the new rise time is $$\tau_s = 2.2 \frac{L}{R_S + R_L} = 2.2 \frac{2L}{NR_L} = \frac{2 \cdot \tau}{N}$$

Thus, this circuit provides an improvement in current rise time by the factor $N/2$. The value of resistance $R_{P1}$ can be determined by a similar analysis.

The actual voltage $E_S$ appearing across the secondary of the transformer in FIG. 1 is not a step function as assumed in FIG. 2 but, instead, is a potential which rises sharply and then decays exponentially as condenser C2 charges. However, the secondary potential remains sufficiently high for a period of time long enough to produce a current rise time improvement of almost N times as predicted in the foregoing analysis.

It is to be understood that the above-described arrangements are but illustrative of the application of the principles of the invention. Numerous other arrangements may be devised by those skilled in the art without departing from the spirit and scope of the invention. Also, the present description has assumed that the current pulses having the overshoot and undershoot are applied to inductive devices in order to produce faster changes of magnetic fields. The invention was so described to facilitate an understanding thereof and so that the benefits accruing from the use of overshoot and undershoot may be better appreciated. It is, however, to be understood that the foregoing is not a limitation and that the pulse generator comprising the present invention may be used with any type of load and for whatever purposes may be desired.

What is claimed is:

1. In a circuit for producing load current pulses having short rise times and a predetermined amount of leading edge overshoot, a load, a source of potential E1, a switch, means effective upon the operation of said switch for generating and applying to said load a timewise decaying potential E2 having an initial magnitude greater than E1 to produce a predetermined amount of current overshoot in said load, and means effective at a predetermined time subsequent to said application of said potential E2 for connecting said potential E1 to said load to maintain the load current at a steady state pulse magnitude.

2. In a circuit for producing load current pulses having short rise times and a predetermined amount of leading edge overshoot, a load, a source of potential E1, a switch, means effective upon the operation of said switch for generating and applying to said load a timewise decaying potential E2 having an initial magnitude greater than E1 to produce a predetermined amount of current overshoot in said load, and means effective after said predetermined overshoot has been attained for connecting said potential E1 to said load for the duration of each pulse.

3. In a circuit for producing load current pulses having short rise times and a predetermined amount of leading edge overshoot, a load, a source of potential E1, a switch, means effective upon the operation of said switch for generating and applying to said load a timewise decaying potential E2 having an initial magnitude greater than E1 to produce a predetermined amount of current overshoot in said load, and means effective when the magnitude of said potential E2 decays to E1 for connecting said potential E1 to said load.

4. In a circuit for producing load current pulses having short rise times and a predetermined amount of leading edge overshoot, a load, a source of potential E1, a switch, means effective upon the operation of said switch for generating and applying to said load a timewise decaying potential E2 having an initial magnitude greater than that of said potential E1 to produce a predetermined amount of current overshoot in said load, and a diode effective as the magnitude of said potential E2 decays to E1 for connecting said potential E1 to said load for the duration of each pulse.

5. In a circuit for producing load current pulses having short rise times and fall times together with a predetermined amount of leading edge overshoot and trailing edge undershoot, a load, a source of potential E1, means for initiating a load pulse, means effective upon the initiation of each pulse for generating and applying to said load a timewise decaying potential E2 having an initial magnitude greater than E1 to produce a predetermined amount of current overshoot in said load, means effective subsequent to said application of said potential E2 for connecting said potential E1 to said load to maintain a steady state pulse pulse current, and means effective at the end of each pulse for removing said potential E1 and for generating and applying a timewise decaying potential of minus E2 to said load to produce a predetermined amount of trailing edge current undershoot.

6. In a circuit for producing load current pulses having short rise and fall times and a predetermined amount of leading edge overshoot and trailing edge undershoot, a source of potential E1, a load, a switch operable to effect the initiation and termination of a load current pulse, means effective upon the closure of said switch upon the initiation of each pulse for generating and applying to said load a timewise decaying potential E2 having an initial magnitude greater than E1 to produce a predetermined amount of current overshoot in said load, means effective as the magnitude of said potential E2 decays to E1 for connecting said potential E1 to said load for the duration of each pulse, and means effective at the end of each pulse for removing said potential E1 and for generating and applying a timewise decaying potential of minus E2 to said load to produce the predetermined amount of trailing edge undershoot.

7. In a circuit for producing load current pulses having short rise and fall times and a predetermined amount of leading edge overshoot and trailing edge undershoot, a load, a source of potential E1, a switch operable to effect the initiation and termination of each pulse, means effective upon the closure of said switch upon the initiation of each pulse to apply to said load a timewise decaying potential E2 having an initial magnitude greater than that of E1 to produce a desired amount of current overshoot in said load, a diode effective when the magnitude of said potential E2 decays to E1 for connecting potential E1 to said load to maintain a steady-state current therein for the duration of each pulse, and means effective upon the opening of said switch at the end of each pulse for generating and applying a timewise decaying potential minus E2 to said load to produce the desired amount of trailing edge current undershoot therein.

8. In a circuit for producing load current pulses having short rise and fall times and a predetermined amount of leading edge current overshoot and trailing edge undershoot, a load, a source of potential E, a condenser, a step-up transformer having a primary and a secondary winding and a turns ratio N, means for initiating and terminating each pulse, means effective upon the initiation of each pulse to charge said condenser through the primary of said transformer to induce in its secondary a timewise decaying potential having an initial magnitude of NE, means for applying said induced potential to said load to produce a predetermined amount of current overshoot therein, means effective as the magnitude of said induced potential decays to E for connecting said potential E to said load for the duration of each pulse, and means effective at the end of each pulse for discharging said condenser through said primary to induce a timewise decaying potential having an initial magnitude of minus NE in said secondary in order to effect said predetermined trailing edge undershoot.

9. In a circuit for producing load current pulses having short rise and fall times and a predetermined amount of leading edge overshoot and trailing edge undershoot, a load, a source of potential E, a condenser, a step-up transformer having a primary and a secondary winding and a turns ratio N, a switch operable to effect the initiation and termination of each pulse, means effective upon the closure of said switch to charge said condenser through the primary of said transformer thereby inducing in its secondary a timewise decaying potential having an initial magnitude of NE, means for applying said induced potential to said load to produce a predetermined amount of current overshoot therein, a diode effective as the magnitude of said induced potential decays to E for connecting said potential E to said load for the duration of each pulse, and means effective when said switch is subsequently opened for discharging said condenser through said primary to induce in said secondary a timewise decaying potential having an initial magnitude of minus NE in order to effect the desired amount of trailing edge load current undershoot.

10. In a circuit for producing load current pulses having short rise and fall times and a predetermined amount of leading edge overshoot and trailing edge undershoot, a load, a source of potential E, a condenser, a step-up transformer having a primary and a secondary winding and a turns ratio N, a switch operable to effect the initiation and termination of each pulse, means effective upon the closure of said switch upon the initiation of each pulse to charge said condenser through the primary of said transformer thereby inducing in its secondary a timewise decaying potential having an initial magnitude of NE, means for applying said induced potential to said load to produce a predetermined amount of current overshoot therein, means effective as the magnitude of said induced potential decays to E for connecting said potential E to said load for the duration of each pulse, a second switch, means effective upon the opening of said first mentioned switch at the end of each pulse for closing said second switch, and means responsive to the closure of said second switch for discharging said condenser through said primary to induce in said secondary a timewise decaying potential having an initial magnitude of minus NE and thereby effect the predetermined current undershoot on each trailing pulse edge.

11. In a circuit for producing load current pulses having short rise and fall times and a predetermined amount of leading edge overshoot and trailing edge undershoot, a load, a source of potential E, a condenser, a step-up transformer having a primary and a secondary winding and a turns ratio N, a switch operable to effect the initiation and termination of each pulse, means effective upon the closure of said switch upon the initiation of each pulse to charge said condenser through the primary of said transformer to induce in its secondary a timewise decaying potential having an initial magnitude of NE, means for applying said induced potential to said load to produce a predetermined amount of current overshoot therein, means effective as the magnitude of said induced potential decays to E for connecting said potential E to said load for the duration of each pulse, a thyratron, means effective upon the opening of said switch at the end of each pulse for causing said thyratron to conduct, and means responsive to the conduction of said thyratron for discharging said condenser through said primary to induce a timewise decaying potential having an initial magnitude of minus NE in said secondary and thereby effect the desired amount of current undershoot on each trailing pulse edge.

12. A circuit for producing load current pulses having short rise times together with a desired amount of leading edge pulse overshoot comprising, a source having a potential E with respect to ground, a switch having two contacts one of which is connected to said potential E, a load one side of which is grounded, a diode whose anode is connected to the other contact of said switch aand whose cathode is connected to the ungrounded side of said load, a step-up transformer having a primary and a secondary winding and a turns ratio N, a first condenser interconnecting one side of said secondary and the ungrounded side of said load, means connecting the other side of said secondary to ground; a second condenser connected between ground and one side of said primary, and a resistor connected between another side of said primary and said second contact of said switch for controlling the peak current produced in said load by the secondary as said switch is closed upon the initiation of a pulse.

13. A circuit for producing load current pulses having short rise times together with a predetermined amount of overshoot and undershoot on the leading and trailing edge respectively of each pulse comprising, a source having a potential E with respect to ground, a two contact switch one of whose contacts is connected to said potential E, a load one side of which is grounded, a diode whose anode is connected to the other contact of said switch and whose cathode is connected to the ungrounded side of said load, a step-up transformer having a primary and a secondary winding and a turns ratio N, a first condenser interconnecting one side of said secondary and the ungrounded side of said load, means connecting the other side of said secondary to ground, a second condenser connected between ground and one side of said primary, a resistor connected between another side of said primary and said second contact of said switch for controlling the peak current produced in said load by the secondary as said switch is closed upon the initiation of a pulse, and means for discharging said second condenser through said primary as said switch is opened at the end of each pulse.

14. A circuit for producing load current pulses having short rise times together with a predetermined amount of overshoot and undershoot on the leading and trailing edge respectively of each pulse comprising, a source having a potential E with respect to ground, a switch having two contacts one of which is connected to said potential E, a load having two terminals one of which is grounded, a diode whose anode is connected to the other contact of said switch and whose cathode is connected to the other terminal of said load, a step-up transformer having a primary and a secondary winding and a turns ratio N, a first condenser interconnecting one side of said secondary and the ungrounded terminal of said load with the other side of said secondary being grounded, a second condenser connected between ground and one side of said primary, a resistor connected between the other side of said primary and said second contact of said switch for controlling the peak current produced in said load by the secondary as said switch is closed upon the initiation of a pulse, a normally nonconductive element interconnecting the junction of said resistor and said primary with said ground, and means for causing said element to conduct and discharge said second condenser in response to the opening of said switch upon the termination of each pulse.

15. A circuit for producing load current pulses having short rise times together with a predetermined amount of overshoot and undershoot on the leading and trailing edge respectively of each pulse comprising, a source having a potential E with respect to ground, a switch having two contacts one of which is connected to said potential E, a load having two terminals one of which is grounded, a diode whose anode is connected to the other contact of said switch and whose cathode is connected to the ungrounded terminal of said load, a step-up transformer having a primary and a secondary winding and a turns ratio N, a first condenser interconnecting one side of said secondary and the ungrounded terminal of said load with the other side of said secondary being grounded, a second condenser connected between ground and one side of said primary, a resistor connected between the other side of said primary and said second contact of said switch for controlling the peak current produced in said load by the secondary as said switch is closed upon the initiation of a pulse, a normally nonconductive means having a control element interconnecting the junction of said resistor and said primary with said ground, and means for impressing a signal on said control element to cause said normally nonconductive means to conduct and discharge said second condenser in response to the opening of said switch upon the termination of each pulse.

16. A circuit for producing load current pulses having short rise times together with a predetermined amount of overshoot and undershoot on the leading and trailing edge respectively of each pulse, a source having a potential E with respect to ground, a switch having two contacts one of which is connected to said potential E, a load having two terminals one of which is grounded, a diode whose anode is connected to the other contact of said switch and whose cathode is connected to the ungrounded terminal of said load, a step-up transformer having a primary and a secondary winding and a turns ratio N, a first condenser interconnecting one side of said secondary and the ungrounded terminal of said load with the other side of said secondary being grounded, a second condenser connected between ground and one side of said primary, a resistor connected between the other side of said primary and said second contact of said switch for controlling the peak current produced in said load by the secondary as said switch is closed upon the initiation of a pulse, a normally nonconductive thyratron interconnecting the junction of said resistor and said primary with said ground, and means for causing said thyratron to conduct and discharge said second condenser in response to the opening of said first mentioned switch upon the termination of each pulse.

17. A circuit for producing load current pulses having short rise times together with a predetermined amount of overshoot and undershoot on the leading and trailing edge respectively of each pulse, a source having a potential E with respect to ground, a switch having two contacts one of which is connected to said potential E, an inductive load having two terminals one of which is grounded, a diode having an anode connected to the other contact of said switch and a cathode connected to the ungrounded terminal of said load, a step-up transformer having a primary and a secondary winding and a turns ratio N, a first condenser interconnecting one side of said secondary and the ungrounded terminal of said load with the other side of said secondary being grounded, a second condenser connected between ground and one side of said primary, a resistor connected between the other side of said primary and said second contact of said switch for controlling the peak current produced in said load by the secondary as said switch is closed upon the initiation of a pulse, a normally nonconductive thyratron interconnecting the junction of said resistor and said primary with said ground, an inductance and a resistance connected in series between ground and said other contact of said switch, a third condenser, a control element on said thyratron connected by means of said third condenser to the junction of said inductance and said resistance, and means including said control element and said inductance for causing said thyratron to conduct and discharge said second condenser in response to the opening of said switch upon the termination of each pulse.

18. In combination with a load, a circuit for producing load current pulses having short rise times and a predetermined amount of leading edge overshoot, said circuit comprising a source of potential $E_1$, means for generating and applying a timewise decaying potential $E_2$ having an initial magnitude greater than $E_1$ to said load upon the initiation of each pulse to produce said overshoot, and means effective upon the attainment of said predetermined overshoot for applying said source $E_1$ to said load for the remainder of each pulse.

References Cited in the file of this patent
UNITED STATES PATENTS
2,941,125    Lippincott _____ June 14, 1960
OTHER REFERENCES
Olson: I.B.M. Tech. Bull., Feb. 5, 1960.